United States Patent
Kawasaki et al.

[11] Patent Number: 5,825,443
[45] Date of Patent: Oct. 20, 1998

[54] COLOR LIQUID CRYSTAL DISPLAY WITH THREE DICHROIC MIRRORS REFLECTING IN DIFFERENT DIRECTIONS TO THREE PIXELS WHICH REFLECT TO COMMON OPTICS

[75] Inventors: Eishi Kawasaki, Kuwana; Tsukasa Koumura, Toyota; Shoichi Onda, Toyokawa; Tadao Ohoka, Aichi-gun, all of Japan

[73] Assignee: Denso Corporation, Kariya, Japan

[21] Appl. No.: 802,277

[22] Filed: Feb. 19, 1997

[30] Foreign Application Priority Data

Feb. 20, 1996 [JP] Japan .................................. 8-032411

[51] Int. Cl.⁶ .................................................. G02F 1/1335
[52] U.S. Cl. .................................. 349/95; 349/62; 349/5; 349/106
[58] Field of Search .................................. 349/95, 62, 5, 349/8, 106

[56] References Cited

U.S. PATENT DOCUMENTS

| | | | |
|---|---|---|---|
| 4,824,216 | 4/1989 | Perbet et al. | 349/74 |
| 5,056,912 | 10/1991 | Hamada et al. | 349/95 |
| 5,161,042 | 11/1992 | Hamada | 349/62 |
| 5,446,510 | 8/1995 | Mitsutake et al. | 349/5 |
| 5,459,592 | 10/1995 | Shibatani et al. | 349/95 |
| 5,633,737 | 5/1997 | Tanaka et al. | 349/5 |
| 5,682,215 | 10/1997 | Nishihara et al. | 349/95 |
| 5,689,321 | 11/1997 | Kochi | 349/8 |

FOREIGN PATENT DOCUMENTS 63-240525 10/1988 Japan .
6-250177 9/1994 Japan .
6-308492 11/1994 Japan .

*Primary Examiner*—Anita Pellman Gross
*Assistant Examiner*—Tarifur R. Chowdhury
*Attorney, Agent, or Firm*—Cushman Darby Cushman IP Group of Pillsbury Madison & Sutro LLP

[57] ABSTRACT

White light projected from a white light source is divided into three light beams of primary colors, i.e., red, green and blue by a dichroic mirror. Three light beams projected from the dichroic mirror are made incident upon a micro-lens array and reflected on and modulated in a liquid crystal panel disposed beneath the micro-lens array. The liquid crystal panel is driven by a driver circuit which supplies color signals to the panel, thereby modulating the light beams in the panel. The modulated light beams are projected from the micro-lens array to a schlieren diaphragm which eliminates scattered light components from the light beams. The light beams then enter into a projection lens and display color images on the screen. Since light beams constituting a picture element consisting of red, green and blue colors are projected from a single micro-lens of the micro-lens array, a color image displayed on the screen has no blur among three primary colors. Since the three primary color beams are projected on the liquid crystal panel and modulated therein, only a single liquid crystal panel having no color filters is used in the display device.

14 Claims, 16 Drawing Sheets

COLOR LIQUID CRYSTAL DISPLAY WITH THREE DICHROIC MIRRORS REFLECTING IN DIFFERENT DIRECTIONS TO THREE PIXELS WHICH REFLECT TO COMMON OPTICS

CROSS-REFERENCE TO RELATED APPLICATION

This application is based upon and claims benefit of priority of Japanese Patent Application No. Hei-8-32411 filed on Feb. 20, 1996, the content of which is incorporated herein by reference.

BACKGROUND OF THE INVENTION

1. Field of the Invention

The invention relates to a color liquid crystal display device which displays color images projected on a screen, using a single liquid crystal panel having no color filters on which light beams of three primary colors, i.e., red, green and blue are emitted in mutually different directions.

2. Description of Related Art

A color liquid crystal display device using a single liquid crystal panel of this kind has been proposed, for example, in Japanese Patent Laid-Open Publication No. Hei-4-60538. Light beams having three primary colors are emitted through a micro-lens array on the liquid crystal panel in mutually different directions and each beam of a primary color is modified thereon to display color images on the screen projected through a projection lens.

In a display device of this kind, the device can be made compact because only one liquid crystal panel is used. Moreover, since no color filters which decrease an efficiency of light usage to one third are not used, almost all of the beams of primary colors are utilized to display images on a screen, and accordingly a bright color display is realized. In the proposed device, however, each light beam of a respective primary color is modified by a respective picture element on the liquid crystal panel and emitted from the panel as a respective beam to project images on the screen through a projection lens. Accordingly, images corresponding to respective primary colors are displayed at different positions from one another when the images are observed at a short distance from the screen. This means that an image consisting of beams having three primary colors can not be displayed as a single image. In other words, an image having a compound color like white is displayed with a blur. Therefore, a quality display cannot be attained in the conventional device.

SUMMARY OF THE INVENTION

The present invention has been made in view of the above-mentioned problem, and an object of the present invention is to provide a color liquid crystal display device using a single liquid crystal panel having no color filters which is able to achieve a quality display.

In the display device, white light emitted from a white light source is divided into three primary color beams by a dichroic mirror. Three primary color beams (red, green and blue ) are projected in respective directions by a three-position reflecting mirror and made incident upon a single color liquid crystal panel having no color filters through a micro-lens array overlapped on the liquid crystal panel. Three light beams are reflected on reflecting picture element electrodes and modulated at the same time in the panel. The color liquid crystal panel is driven according to color signals from a driver circuit. Modulated light beams are projected from the micro-lens array. Scattered light components included in the light beams are eliminated through a shclieren diaphragm. The three light beams coming through the diaphragm are fed into a projector lens system and projected on a screen.

When three primary color light beams enter into the micro-lens array, they are collimated by a collimator lens disposed on the micro-lens array. The micro-lens array is composed of a plurality of micro-lenses having a spherical surface arranged densely in contact with one another. Parallel light beams collimated through the collimator lens are converged by micro-lenses on respective picture element electrodes, disposed in the panel, each receiving red, green or blue color signals from the driver circuit. Each light beam is reflected on the respective electrode and modulated at the same time in the panel. Three light beams reflected on the respective electrodes enter into a common micro-lens which is disposed in contact with three micro-lenses which receive three primary color light beams respectively.

In this manner, color images corresponding to the color signals supplied to the liquid crystal panel are projected on the screen, showing no blur among the primary colors, since three primary color light beams constituting a color image element are projected from a single micro-lens of the micro-lens array. Since the three primary color light beams are projected on the liquid crystal panel, there is no need to use color filters. A single liquid crystal panel suffices for a color display.

A transparent liquid crystal panel which modulates the light beams passing therethrough according to color signals may also be used in the display device according to the present invention. Individual micro-lenses in the micro-lens array may be made in a shape of a hexagon or a square, or in other forms. The picture element electrodes may be made in a shape of a rhombus or in other shapes according to the shapes of the micro-lenses.

The dichroic mirror for dividing white light into three primary color light beams may be the one composed of three dichroic mirror plates disposed with certain angles thereamong, or may be replaced by a cross-dichroic prism composed of four dichroic prisms or by dichroic mirror plates arranged in a direction of light beam path together with reflecting mirrors.

Other objects and features of the present invention will become more readily apparent from a better understanding of the preferred embodiment described below with reference to the following drawings.

BRIEF DESCRIPTION OF THE DRAWINGS

FIGS. 1 through 12 show a first embodiment according to the present invention.

FIG. 1 is a conceptual drawing showing a whole construction of a color liquid crystal display device using a single liquid crystal panel;

FIG. 2 is a schematic drawing showing an optical system of the display device;

FIG. 3 is a schematic drawing showing a plane P0 of FIGS. 1 and 2 viewed from its upper side;

FIG. 4 is a schematic plan view showing a micro-lens array;

FIG. 5 is a schematic plan view showing reflecting picture element electrodes of a reflecting liquid crystal panel;

FIG. 6 is a schematic plan view showing an overlapped surface of the micro-lens array and the reflecting picture element electrodes;

FIG. 8 is a perspective view showing directions of light beams R, G and B incident upon and transmitted from the micro-lens array;

FIG. 9 is a partially enlarged plan view showing the overlapped surface of the micro-lens array and the reflecting picture element electrodes;

FIG. 10 is a schematic drawing showing a relation between a focal distance of the micro-lens and a position of the reflecting picture element electrodes;

FIG. 11 is a schematic cross-sectional view of the micro-lens array;

FIG. 12 is a cross-sectional view of the micro-lens array and the reflecting liquid crystal panel overlapped on each other;

FIG. 14 is a plan view showing a micro-lens array;

FIG. 15 is a plan view showing reflecting picture element electrodes;

FIG. 16 shows an overlapped surface of the micro-lens array and the reflecting picture element electrodes;

FIG. 17 is a plan view showing an arrangement of reflecting picture element electrodes and a micro-lens array;

FIG. 18 is a cross-sectional view taken along a line XVIII—XVIII in FIG. 17;

FIG. 20 is a conceptual drawing showing an optical system;

FIG. 21 is a plan view showing a surface POa of FIG. 20, viewed from its upper side;

DETAILED DESCRIPTION OF THE PREFERRED EMBODIMENTS

Figure 1:
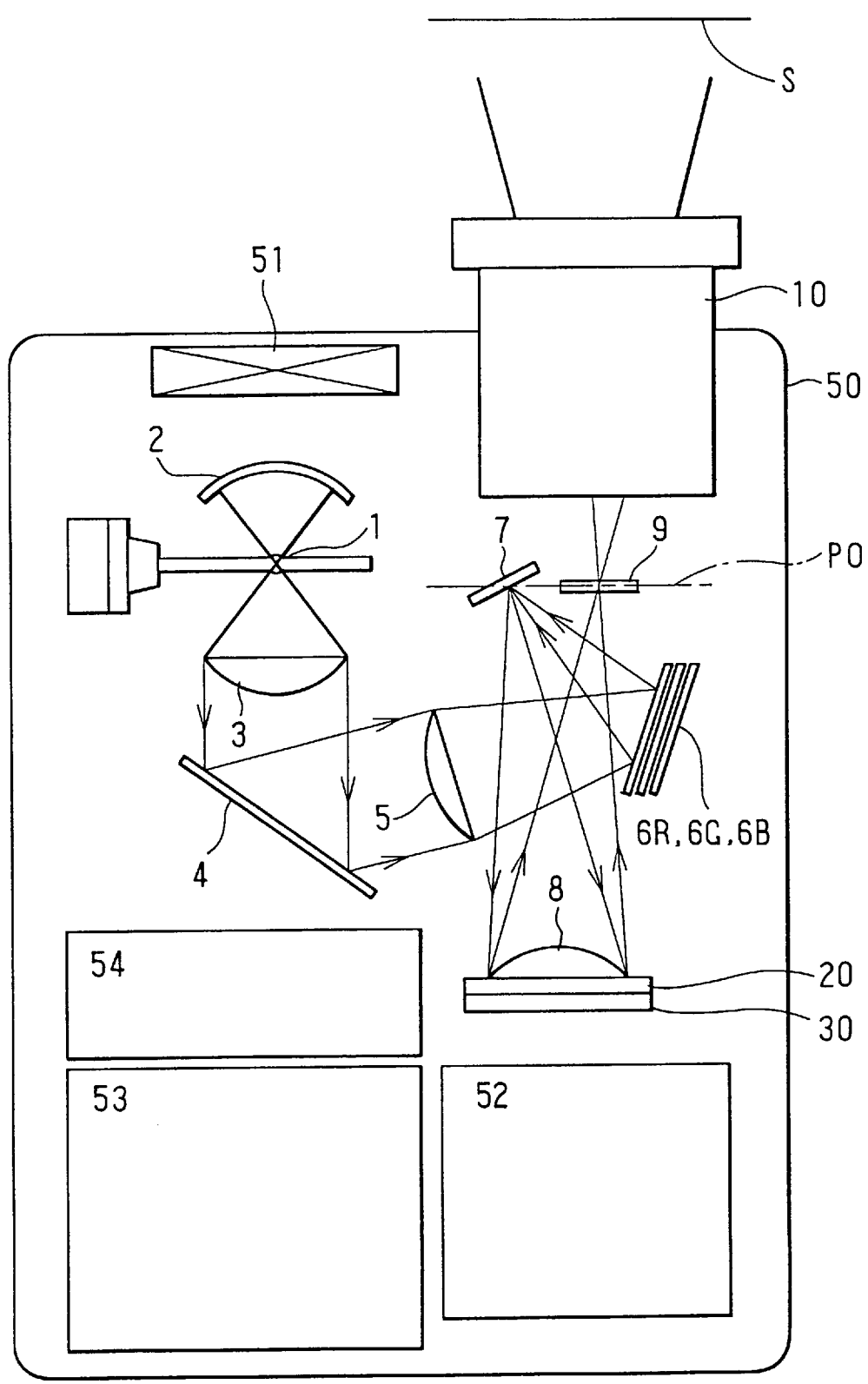
Figure 2:
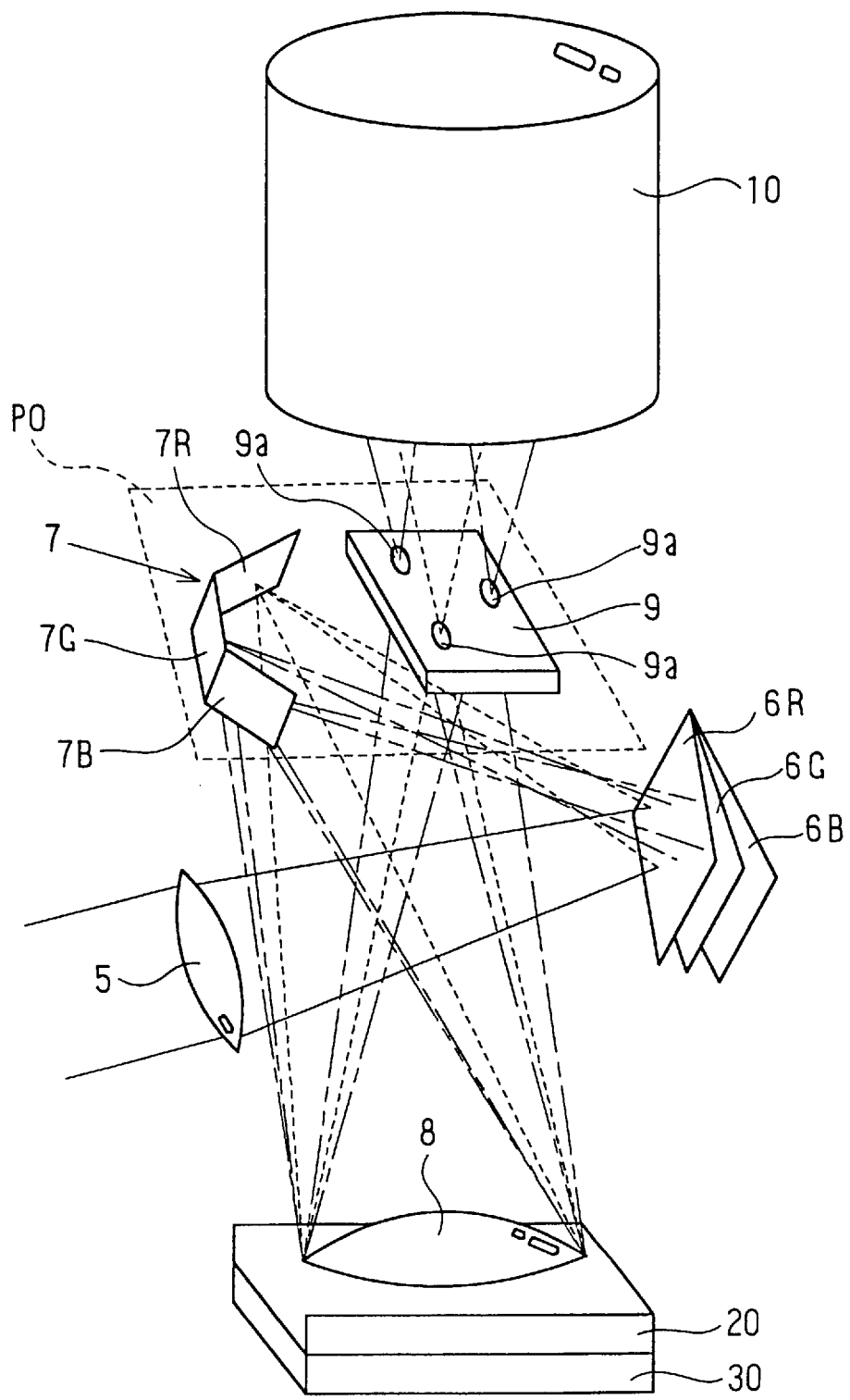

A first embodiment according to the present invention will be explained referring to FIGS. 1 through 12. FIG. 1 shows a whole construction of a color liquid crystal display device in which a single liquid crystal panel is used, and FIG. 2 shows an optical system of the device.

As shown in FIG. 1, the device has a white light source 1 having, for example, a metal halide lamp of 21 watts and an arc length of 1.5 mm made by Welch Allen. A spherical mirror 2 is disposed at the back of the white light source 1, and a collimator lens 3 is disposed at the front. Both focal points of the spherical mirror 2 and the collimator lens 3 are set at the center of the white light source 1. Light emitted from the collimator lens 3 is a substantially parallel beam of white light.

At the front of the collimator lens 3, a reflecting mirror 4 which reflects the parallel light from the collimator lens 3, a condenser lens 5 converting the parallel beam to a converged beam, and a dichroic mirrors 6R, 6G and 6B for dividing the white light into three primary colors are disposed. A focal distance of the condenser lens 5 is set so that the light divided and reflected by the dichroic mirrors 6R, 6G and 6B focuses at a neighborhood of a three-position reflecting mirror 7. One of the dichroic mirrors, for example, the mirror 6R selects a light beam having a wavelength of red light and reflects it toward the three-position reflecting mirror 7 while the mirror 6R passes other light beams therethrough. Other dichroic mirrors 6G and 6B function in the same manner, i.e., the dichroic mirror 6G reflects only a green beam and the dichroic mirror 6B reflects only a blue beam. The dichroic mirrors 6R, 6G and 6B are disposed with certain angles therebetween as shown in FIG. 2.

The dichroic mirrors are made of thin film multi-layers of dielectric materials formed on a transparent substrate such as glass by well known thin film manufacturing processes. The dichroic mirror 6R reflects visible light having a wavelength longer than 600 nm, the dichroic mirror 6B reflects visible light having a wavelength shorter than 500 nm, and the dichroic mirror 6G reflects visible light having a wave length in a range from 500 nm to about 570 nm. It is desirable to design the dichromic mirrors 6R, 6G and 6B to pass infrared light therethrough for protecting a liquid crystal panel from a temperature rise. The angles between the respective dichroic mirrors 6R, 6G and 6B, shown in FIG. 2, are determined depending upon an arrangement of a micro-lens 20, a pitch between individual micro-lens, a focal distance thereof and a focal distance of a collimator lens 8. In addition, it is necessary to make the angles between the dichroic mirrors larger than a diverging angle of the parallel beam emitted from the collimator lens 3. The dichroic mirrors 6R, 6G and 6B, thus designed, divide a white light beam into respective light beams of red, green and blue.

As shown in FIG. 2, the light having a wavelength of red light is reflected by the red dichroic mirror 6R and emitted to one of the three-position reflecting mirror 7R and reflected thereby, and then reaches a collimator lens 8 through which the red light beam is incident upon a micro-lens array 20 as a parallel beam. Light having a wavelength of green light passing through the dichroic mirror 6R is reflected by the green dichroic mirror 6G and emitted to one of the three-position reflecting mirror 7G, passing through the red dichroic mirror 6R again, and then reaches a collimator lens 8 through which the green light beam is incident upon a micro-lens array 20 as a parallel beam. In the same manner, light having a wavelength of blue light passing through the dichroic mirrors 6R and 6G is reflected by the blue dichroic mirror 6B and emitted to one of the three-position reflecting mirror 7B, passing through the dichroic mirrors 6G and 6R again, and then reaches a collimator lens 8 through which the blue light beam is incident upon a micro-lens 20 as a parallel beam.

Thus, a white light beam is divided into light beams of three primary colors, and three beams are incident upon the micro-lens array 20 as parallel beams from directions different from one another.

The light beams of three primary colors incident upon the micro-lens array 20 are reflected by a reflecting liquid crystal panel 30 and incident upon the micro-lens array 20 again. The three beams, each having a primary color, are incident upon a micro-lens of the micro-lens array 20 and are emitted toward a schlieren diaphragm 9, and display an image on a screen S through a projection lens 10.

In FIG. 1, a number 50 denotes a case of the device, a number 51 a cooling fan for cooling components in the case, a number 52 a circuit for driving and controlling the reflecting liquid crystal panel 30, a number 53 a regulator for converting AC to DC, and 54 a power source of the metal halide lamp 1.

Figure 3:
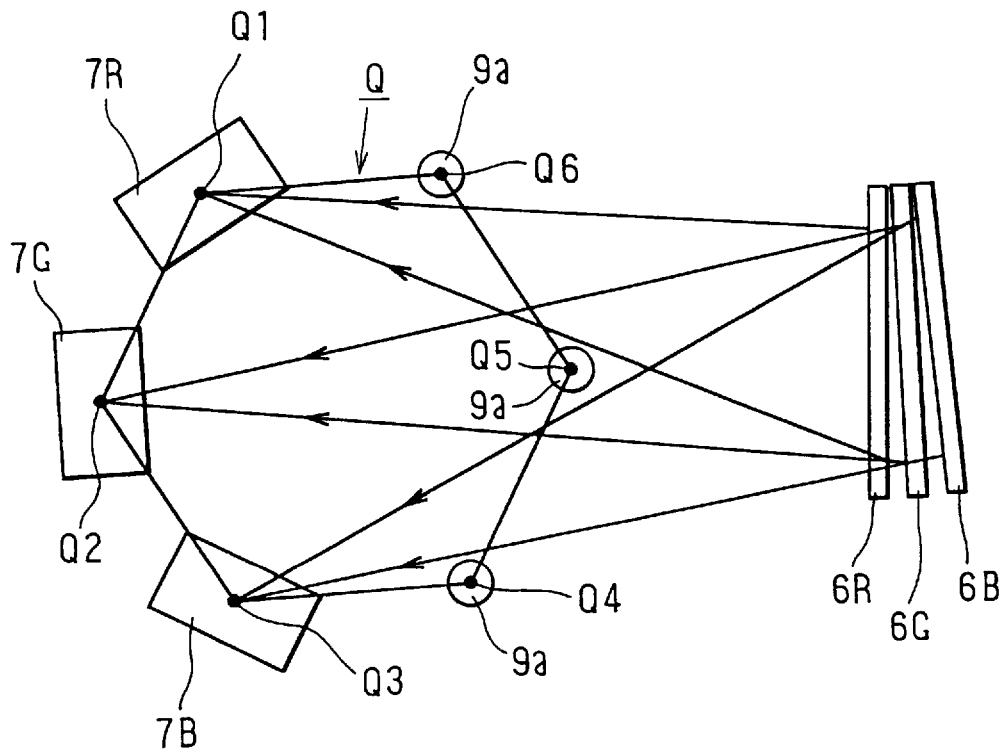

Now, the dichroic mirrors 6R, 6G and 6B, and the three-position reflecting mirror 7 will be explained in detail referring to FIGS. 2 and 3. FIG. 3 is a drawing showing a plane PO shown in FIGS. 1 and 2, viewed from the upper side thereof.

Each light beam of red, green and blue reflected by respective dichroic mirrors 6R, 6G and 6B is again reflected by the respective three-position reflecting mirrors 7R, 7G and 7B in respective directions different from one another, and is incident upon the micro-lens array 20 and reflecting liquid crystal panel 30 through the collimator lens 8 as a parallel beam. Center points of the three-position reflecting mirrors 7R, 7G and 7B are placed on a single plane PO at three neighboring vertexes Q1, Q2 and Q3, of a regular hexagon as shown in FIGS. 3. The regular hexagon includes three other vertexes Q4, Q5 and Q6, the positions of which correspond to three holes 9a of the schlieren diaphragm 9. The collimator lens 8 has its focus on the plane PO so that the beams reflected by the three-position reflecting mirrors 7R, 7G and 7B and incident upon the collimator lens are converted to parallel beams. The diaphragm holes 9a of the diaphragm 9 eliminate diverging light incident thereupon. Light beams reflected by the reflecting liquid crystal panel 30 diverges somewhat when a liquid crystal such as a polymer dispersed liquid crystal is used in the liquid crystal panel 30. In the case a usual TN liquid crystal is used, the diaphragm 9 may be eliminated.

Now, a positional relation between the micro-lens array 20 and the reflecting liquid crystal panel 30 will be explained referring to FIGS. 4 through 9. A perspective view of the micro-lens array 20 mounted on the reflecting liquid crystal panel 20 is shown in FIG. 8. The red, green and blue light beams incident upon the micro-lenses 20-1, 20-2 and 20-3, respectively, are reflected by picture element electrodes of the liquid crystal panel 30, and incident upon a micro-lens 20-4 which is common to the three beams, and then emitted therefrom.

Figure 4:
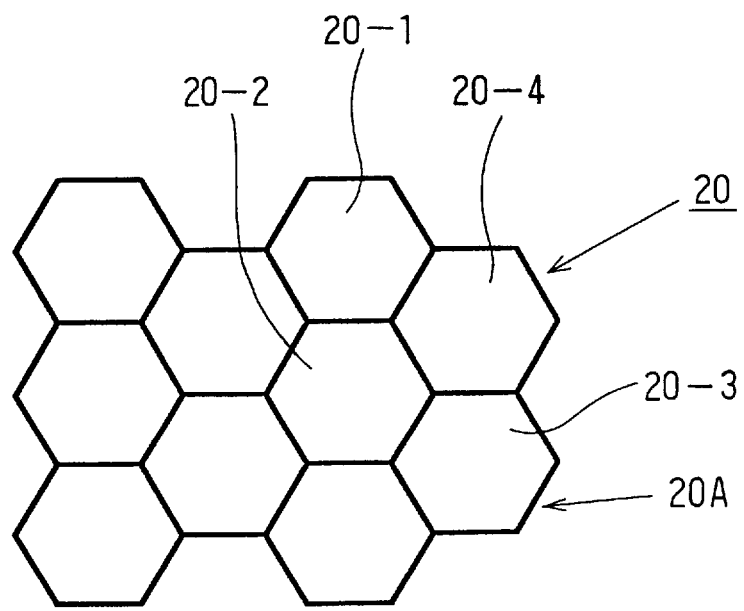

As shown in FIG. 4, the micro-lens array 20 is composed of a plurality of spherical micro-lenses 20-1, 20-2, 20-3, 20-4 . . . arranged densely in a honeycomb shape. An outer periphery 20A of each micro-lens is a regular hexagon in this particular embodiment, but it may be a hexagon.

Figure 5:
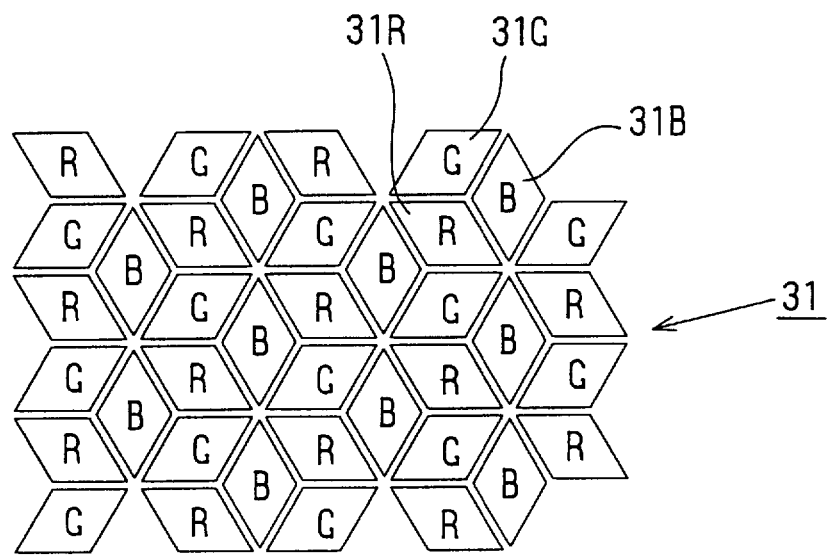

The reflecting picture element electrodes 31 of the reflecting liquid crystal panel 30 are arranged as shown in FIG. 5. A group of the reflecting picture element electrodes consisting of 31R, 31G and 31B is placed in a regular hexagon which is the same shape and the same size as the regular hexagon 20A of the micro-lens array 20. The regular hexagon is divided into three rhombuses, each of which corresponds to each reflecting picture element electrode 31R, 31G and 31B. The reflecting picture element electrodes 31 are made of a material having a high reflection factor such as aluminum. Picture image signals are input to each reflecting picture element electrode 31R, 31G and 31B.

Figure 6:
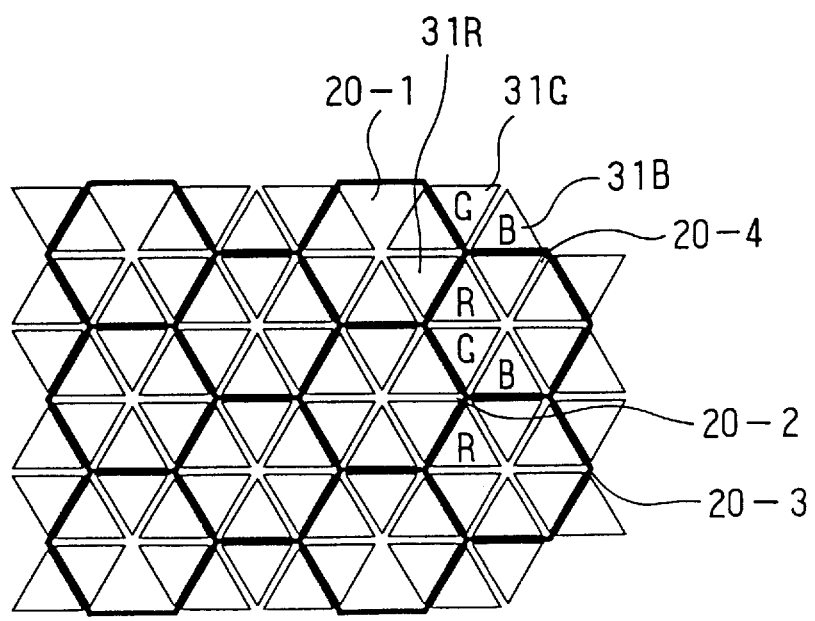

The micro-lens array 20 and the reflecting liquid crystal panel 30 are overlapped as shown in FIG. 6. A center of the hexagon having the three reflecting picture element electrodes 31R, 31G and 31B therein is place at a vertex of the hexagon 20A of the micro-lens array 20.

Figure 7A:
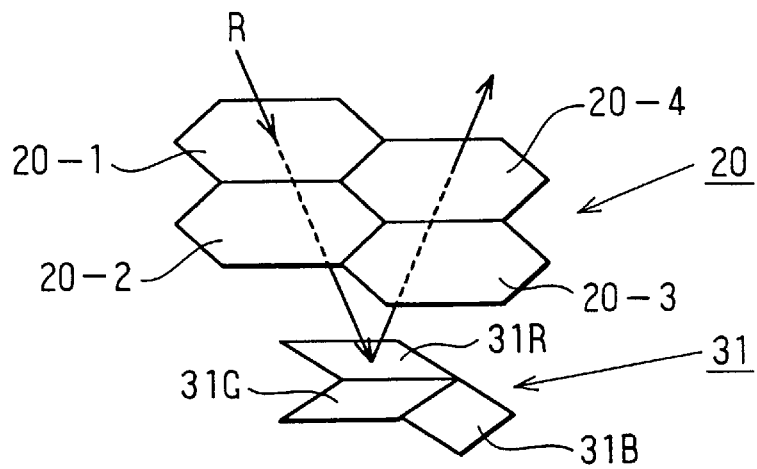
FIGS. 7A, 7B and 7C show positional relations between a micro-lens and a reflecting picture element electrode, for light beams R, G and B, respectively.
Figure 7B:
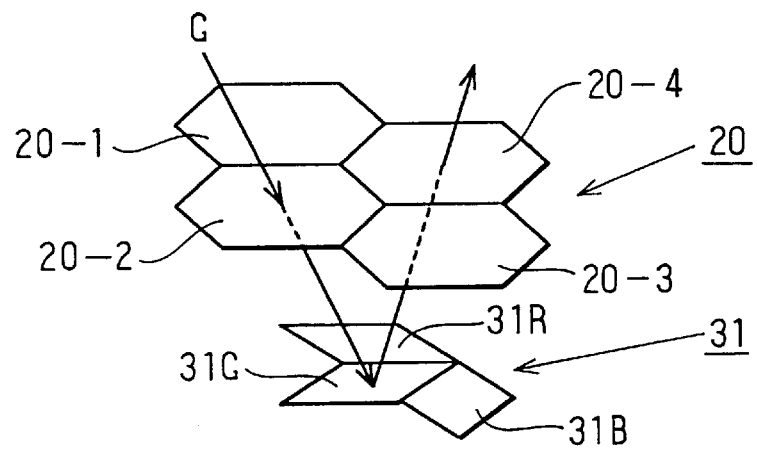
Figure 7C:
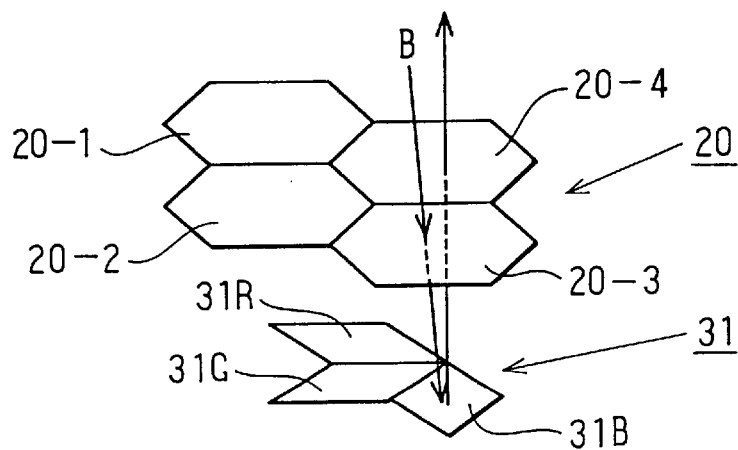
Figure 8:
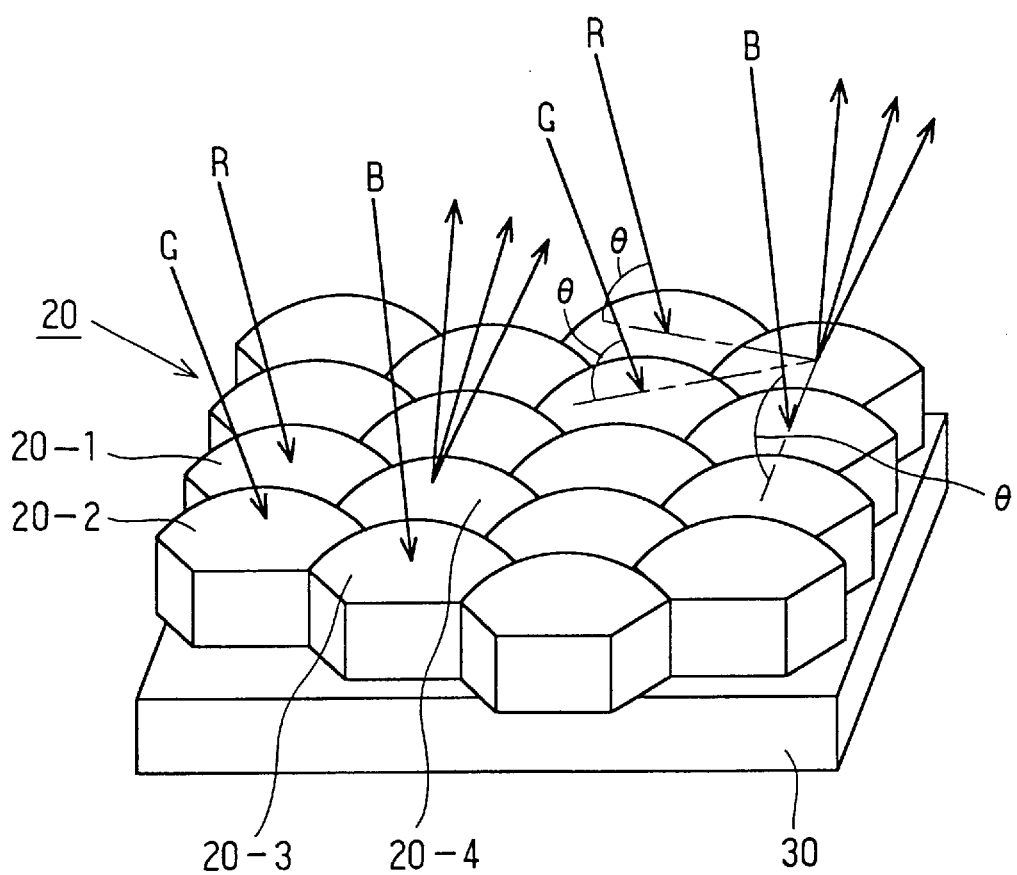

Referring to FIGS. 7A, 7B and 7C, reflection of the light beams on the reflecting picture elements will be explained. The three parallel light beams R, G and B coming from different directions from each other enter into each of the micro-lens are reflected on each of corresponding picture element electrodes 31R, 31G and 31B, and then emitted toward the schlieren diaphragm 9 through a micro-lens. To simplify the explanation, following description will be made assuming that each of the three beams R, G and B enters into one micro-lens, respectively, and is emitted through one micro-lens.

As shown in FIG. 7A, the parallel red light beam R enters into a micro-lens 20-1, and it is converged by the micro-lens 20-1 and emitted on a center of a reflecting picture element electrode 31R which is located just under a common side of both regular hexagons of micro-lenses 20-1 and 20-4. The red light beam is then reflected on the reflecting picture element electrode 31R and enters into the micro-lens 20-4 and emitted therefrom. Similarly, as shown in FIG. 7B, the parallel green light beam G enters into a micro-lens 20-2, and it is converged thereby and emitted on a center of a reflecting picture element electrode 31G which is located just under a common side of both regular hexagons of micro-lenses 20-2 and 20-4. The green light beam is then reflected on the reflecting picture element electrode 31G and enters into the micro-lens 20-4 and emitted therefrom. As shown in FIG. 7C, the parallel blue light beam B enters into a micro-lens 20-3, and it is converged thereby and emitted on a center of a reflecting picture element electrode 31B which is located just under a common side of both regular hexagons of micro-lenses 20-3 and 20-4. The blue light beam is then reflected on the reflecting picture element electrode 31B and enters into the micro-lens 20-4 and emitted therefrom.

As explained above, the three light beams R, G and B incident upon three micro-lenses 20-1, 20-2 and 20-3 are reflected on the corresponding reflecting picture element electrodes 31R, 31G and 31B, and enter into a common lens 20-4 and are emitted from the common lens 20-4. The micro-lens 20-4 is an only one lens which commonly contacts three micro-lenses 20-1, 20-2 and 20-3.

Figure 9:
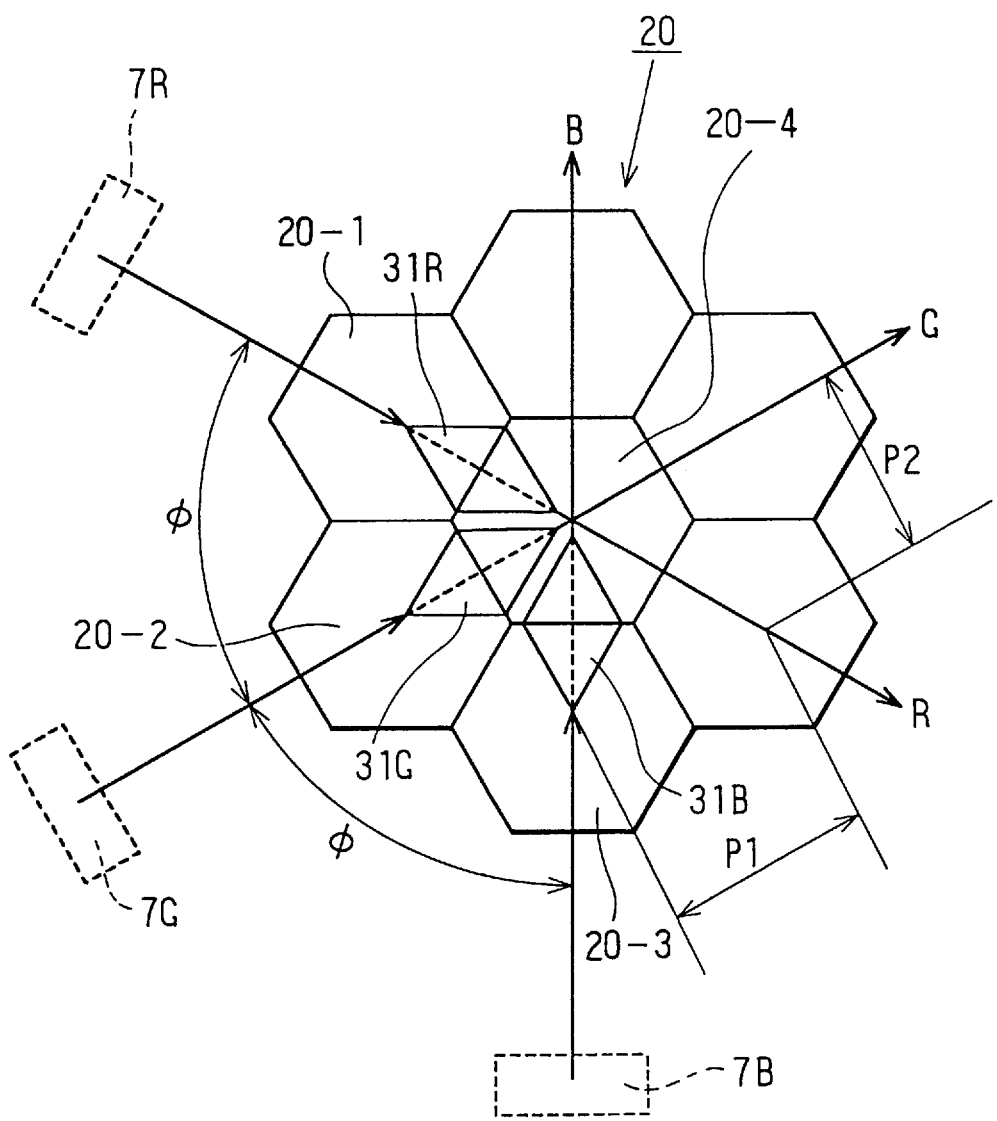

FIG. 9 summarizes the foregoing explanation. The three beams R, G and B reflected by the three-position reflecting mirror 7 and incident upon the collimator lens 8 are collimated by the collimator lens 8. The collimated parallel beams enter into three micro-lenses 20-1, 20-2 and 20-3, respectively, and the light beams are converged thereby. The converged light beams are emitted on the center of the picture element electrodes 31R, 31G and 31B and reflected thereon. Then, the reflected light beams enter into the common micro-lens 20-4 and are emitted therefrom as parallel beams.

A picture image shown on the screen S is constituted by a plurality of picture elements coming from common micro-lenses like a common micro-lens 20-4. Therefore, unlike the picture image of a conventional device in which the image is constituted by three beams of primary colors coming from different micro-lenses, the picture image displayed on the screen by the device according to the present invention has no blur among three primary colors.

Figure 10:
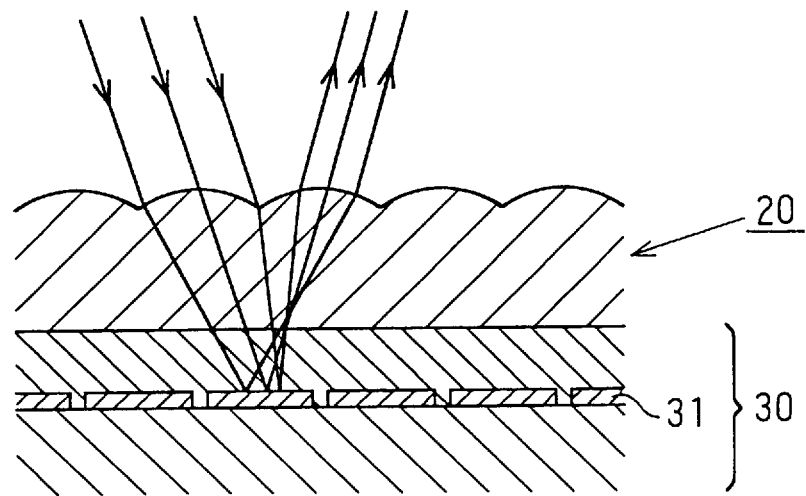

Now, Referring to FIG. 10, a relation between a focal distance of the micro-lens array 20 and a position of reflecting picture element electrodes 31 of the liquid crystal panel 30 will be explained. A focal distance of the micro-lenses is set on the surface of the reflecting picture element electrodes 31 or at a little deeper than the surface. When the focal distance of the micro-lens is set at the surface of the reflecting picture element electrode, the reflected light beam thereon is diverged up to the periphery of a micro-lens from which the beam is emitted as a parallel beam. When the focal distance of the micro-lens is set at a position a little deeper than the surface of the reflecting picture element electrode, as shown in FIG. 10, the light beam reflected on the surface of the electrode does not diverge up to the periphery of the micro-lens emitting the light beam therefrom but diverges only up to a smaller area than an area encircled by the periphery of the micro-lens. Therefore, in the later case, a whole reflected beam is incident upon the micro-lens and emitted therefrom as a parallel beam, improving an efficiency of light energy usage.

In the case where the focal distance of the micro-lens is set at a position deeper than the surface of the reflecting picture element electrode, a picture image projected on a screen is not a dense display composed of a plurality of regular hexagons but a display having some spaces between regular hexagons or a display composed of a plurality of dots.

Figure 11:
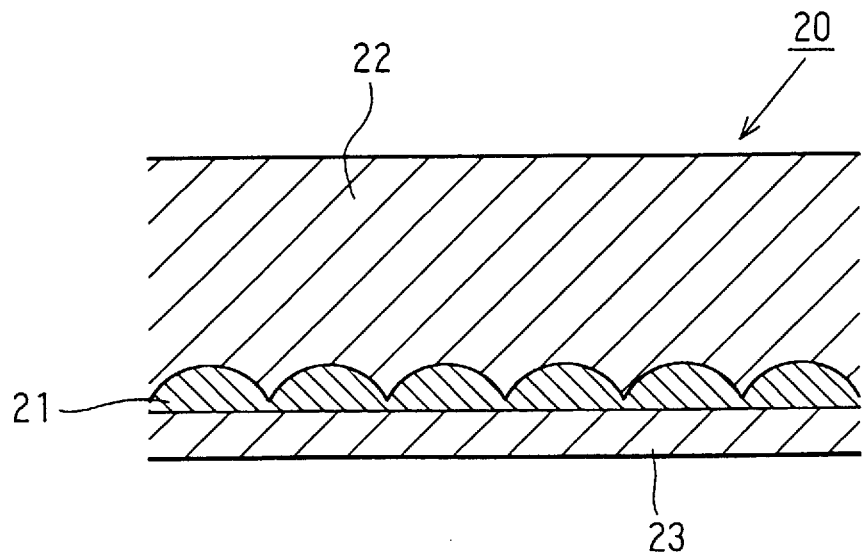

Now, referring to FIGS. 11 and 12, a detailed structure of the micro-lens array 20 and the reflecting liquid crystal panel 30 of the first embodiment will be explained. As shown in FIG. 11, the micro-lens array 20 is composed of a glass substrate 22, micro-lenses 21 (corresponding to micro-lenses 20-1, 20-2, 20-3, 20-4 . . . ) made of a material having a high refractive index, and a film 23 having the same refractive index as the glass substrate 22. The micro-lenses 21 are lenses having a distributed refractive index manufactured using a selective ion dispersion process. A total thickness of the micro-lens array is about 1 mm to 2 mm. A thickness of the film 23 is about 350 $\mu$m so that it corresponds substantially to a focal distance of the micro-lens-lens. A diameter of the micro-lens is about 50 $\mu$m.

Figure 12:
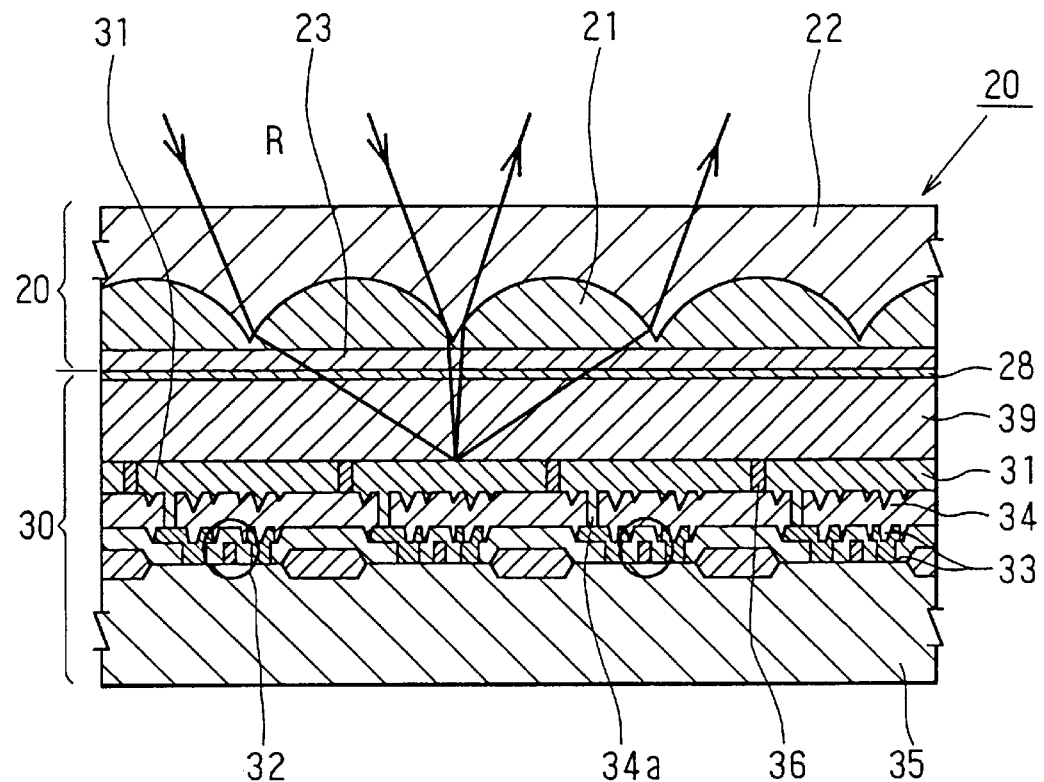

As shown in FIG. 12, the micro-lens array 20 and the reflecting liquid crystal panel 30 are laminated. The reflecting liquid crystal panel 30 is composed of a silicon substrate 35, transistors 32 for driving liquid crystal, a field insulation film 33, an insulating film 34 covering the transistors 32 and the field insulation film 33 made of silicon nitride, reflecting picture element electrodes 31 formed on the insulating film 34, a polymer dispersed liquid crystal 39, and a transparent electrode 28 made of a material such as an ITO. The reflecting picture element electrodes 31 are arranged as shown in FIG. 5, and electrically connected to transistors 32 through holes 34a formed on the insulating film 34. Each reflecting picture element electrode is separated electrically and optically by a separator film 36 from one another. The separator film 36 is formed by lithographic patterning of a photosensitive material such as polyimide with black pigments dispersed or PVA coated on the reflecting picture element electrode.

The transparent electrode 28 is formed on the film 23 of the micro-lens array 20. The liquid crystal 39 is contained between the transparent electrode 28 and the reflecting picture element electrodes 31. Thus, the micro-lens array 20 and the reflecting liquid crystal panel 30 are laminated together and form a single body.

Electric voltages are imposed between the transparent electrode 28 and the reflecting picture element electrodes 31 to drive the liquid crystal 39. The voltages imposed are controlled by the transistors 32, each of which receive one of primary color signals consisting of red, green and blue signals from the driving circuit 52. When no voltage is applied to a reflecting picture element electrode 31, a light beam incident upon the electrode 31 is dispersed in the liquid crystal 39 and emitted from the micro-lens array in a direction different from a normal direction, and accordingly the light is cut by the schlieren diaphragm 9 and is not displayed on the screen. When a signal voltage is applied to a reflecting picture element electrode 31, a light beam incident upon the electrode 31 is reflected thereon and enters again into the micro-lens array, and emitted therefrom in a normal direction through the schlieren diaphragm 9, and accordingly the light displays an image on the screen.

As mentioned above, the incident direction of the light beams of three primary colors R, G and B upon the micro-lens array 20 has to be properly selected in order that the respective beam converges on a corresponding reflecting picture element electrode. Conditions to realize this effect will be explained below, referring to FIGS. 8 and 9.

Assuming that the peripheral shape of the micro-lens is a regular hexagon, there is a following relation between a pitch P1 and a pitch P2, both of which are distances between neighboring regular hexagons as shown in FIG. 9:

$P2=(\sqrt{3}/2) \times P1$

An angle $\theta$ made between an incident light beam direction and a plane of the micro-lens array 20, which is shown in FIG. 8 and is common to three beams R, G and B, is expressed in a following equation:

$\theta=\arctan (2 \times f/P1)$ where f is a focal distance of the micro-lens.
As P1 is 50 $\mu$m and f is 350 $\mu$m in the first embodiment of the present invention, $\theta$ is calculated as 85.9° according to the above equation. An angle between incident beams $\phi$ shown in FIG. 9 is 60°.

In the first embodiment of the present invention, a white light is divided into three light beams of primary colors R, G and B by a dichroic mirrors 6R, 6G and 6B which are slanted with certain angles therebetween. Then, the beams R, G and B are reflected by the respective three-position mirrors 7R, 7G and 7B, each of which is placed at the vertex of the regular hexagon Q shown in FIG. 3. By setting positions and angles of these components properly, the three beams become incident upon the micro-lens array 20 in the proper directions so that the three beams entering into different micro-lenses are reflected by corresponding reflecting picture element electrodes 31 and enter into a common micro-lens from which the three beams are emitted as parallel beams.

The color liquid crystal display device using a single liquid crystal panel according to the present invention enables to display color images with a high contrast having no blur among primary three colors, and can be small in size and manufactured at low cost. Moreover, since the reflecting liquid crystal panel can be used as a single panel, the driving and controlling circuit for the panel can be manufactured using a silicon substrate which has a high electron mobility and is easy to process a micro-structure. In addition, since the light beams emitted from the liquid crystal panel are parallel beams and the schlieren diaphragm 9 for cutting diverged light is equipped in the device, a contrast of images on the screen can be improved. Accordingly, not only a conventional transparent-interceptive liquid crystal such as a TN liquid crystal is used in the panel, but also a transparent-dispersive liquid crystal such as polymer dispersed liquid crystal which is able to display images having a high brightness because no polarizing plate is used therein can be used in the panel.

Figure 13:
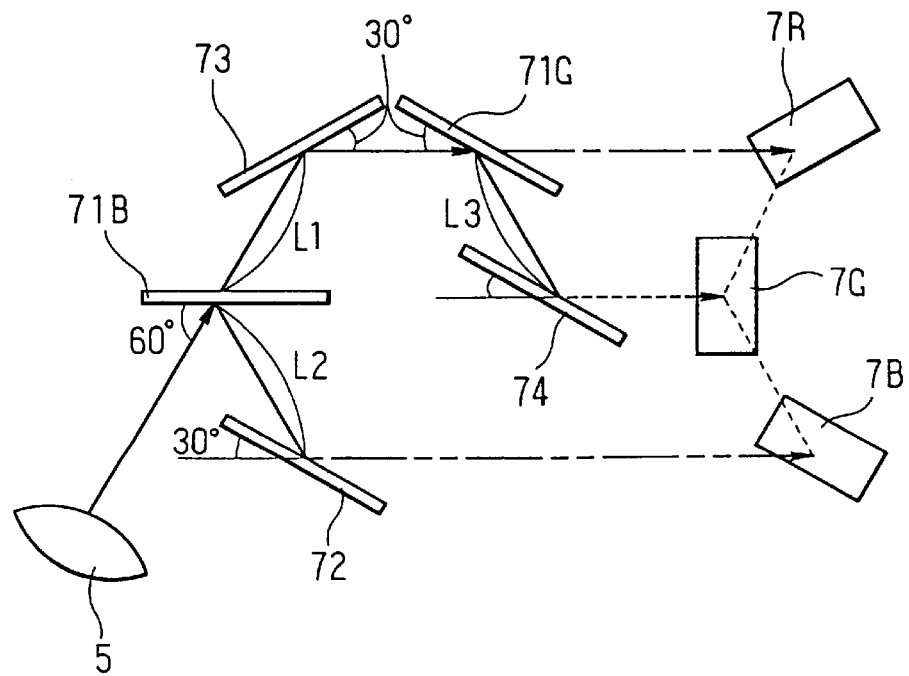
FIG. 13 is a conceptual drawing showing a modification 1 of the first embodiment according to the present invention.

FIG. 13 shows a modification 1 of the first embodiment in which dichroic mirrors 71G and 71B are used in place of the dichroic mirrors 6R, 6G and 6B. A converged white light beam emitted from the condenser lens 5 is incident upon the dichroic mirror 71B. The white light beam is divided into two beams by the dichroic mirror 71B, i.e., one is a blue light beam which is reflected thereon, reflected again on a mirror 72 and incident upon the three-position reflecting mirror 7B with its focus thereon, and the other is a light beam having components other than blue which passes through the dichroic mirror 71B. The light beam passing through the dichroic mirror 71B is reflected on the mirror 73 and incident upon a dichroic mirror 71G. The dichroic mirror 71G divides the light beam into two beams, i.e., one is a green light beam which is reflected thereon, reflected again on the mirror 74 and incident upon the three-position reflecting mirror with its focus thereon, and the other is a red light beam which passes through the dichroic mirror 71G and is incident upon the three-position reflecting mirror 7R with its focus thereon.

The mirrors in this optical system are arranged so that distances therebetween L1, L2 and L3 shown in FIG. 13 are all the same. In this way, light path lengths for three beams R, G and B can be made in an equal distance, which realizes an ideal optical system. In this system, the white light beam can be projected to the three-position reflecting mirrors through the dichroic mirrors 71B and 71G and other mirrors directly from the left side of FIG. 2. Accordingly, components of the display device can be placed and arranged with more flexibility.

Figure 14:
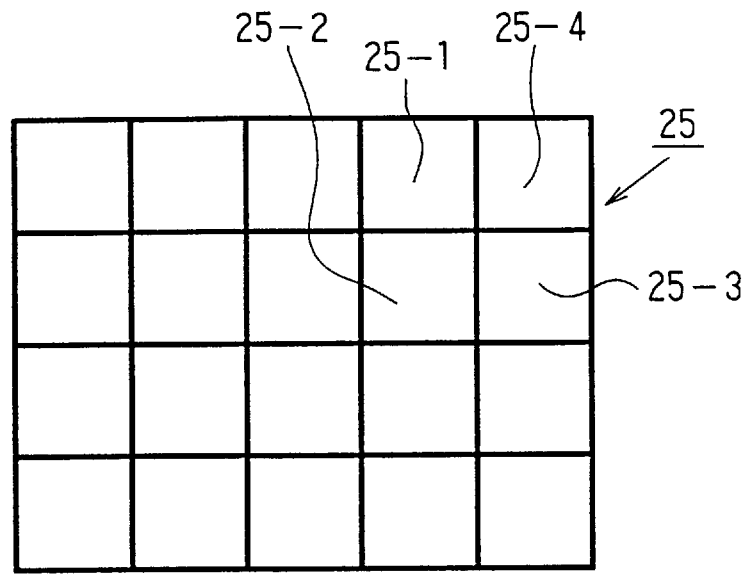
FIGS. 14, 15 and 16 show a modification 2 of the first embodiment according to the present invention.
Figure 15:
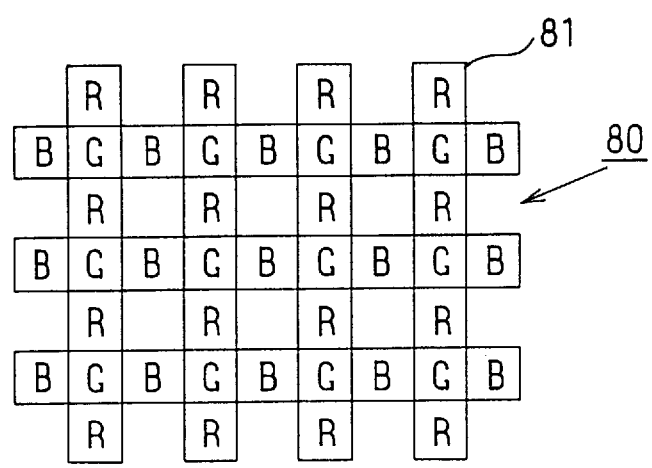
Figure 16:
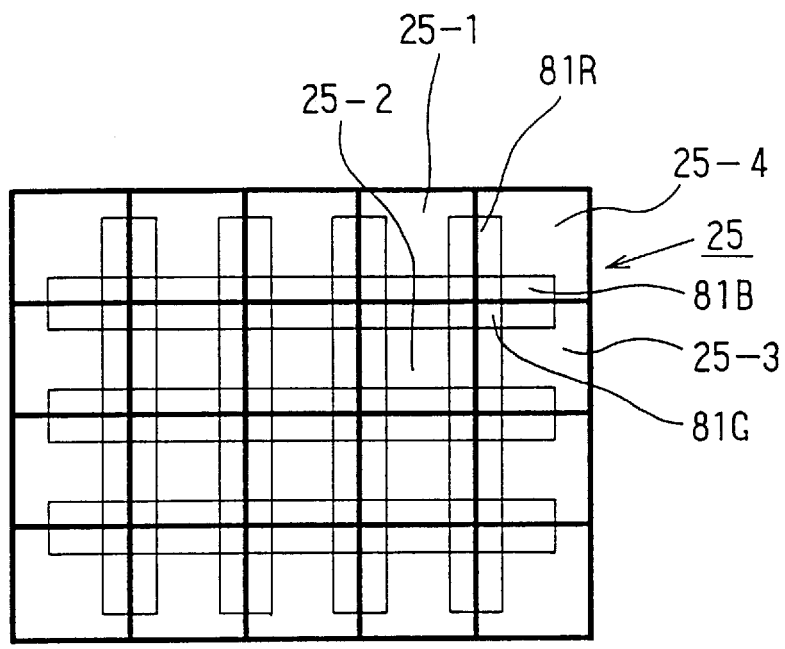

FIGS. 14, 15 and 16 show a modification 2 of the first embodiment in which the regular hexagon micro-lenses of the first embodiment are replaced by square micro-lenses and rhombus reflecting picture element electrodes are replaced by square electrodes. As shown in FIG. 14, a micro-lens array 25 is composed of a plurality of square micro-lenses 25-1, 25-2, 25-3, 25-4 . . . each having a spherical surface. Micro-lenses are aligned densely contacting one another. As shown in FIG. 15, a reflecting picture element electrode 81 is composed of a plurality of square electrodes 81R, 81G and 81B, each of which has a size of one quarter of the micro-lens square. The reflecting picture element electrodes are aligned as shown in FIG. 15. Image signals of red, green and blue are input into the reflecting picture element electrodes 81R, 81G and 81B, respectively.

The micro-lens array 25 and the reflecting picture element electrode 81 are laminated on each other as shown in FIG. 16. The electrode 81G is located on a vertex of the micro-lens square and the electrodes 81R and 81B are located on centers of neighboring sides of the micro-lens square, respectively. A parallel red light beam R incident upon the micro-lens 25-1 is converged on the reflecting picture element electrode 81R which is located just under a common side of the square micro-lenses 25-1 and 25-4, reflected thereon and emitted from the micro-lens 25-4 as a parallel light beam. Similarly, a parallel green light beam G incident upon the micro-lens 25-2 is converged on the reflecting picture element electrode 81G which is located just under a vertex of the square micro-lens 25-4, reflected thereon and emitted from the micro-lens 25-4 as a parallel light beam. In the same manner, a parallel blue light beam B incident upon the micro-lens 25-3 is converged on the reflecting picture element electrode 81B which is located just under a common side of the square micro-lenses 25-3 and 25-4, reflected thereon and emitted from the micro-lens 25-4 as a parallel beam.

In summary, three parallel light beams R, G and B incident upon the micro-lenses 25-1, 25-2 and 25-3 are converged on the reflecting picture element electrodes 81R, 81G and 81B, respectively, reflected thereon, and emitted from the micro-lens 25-4 which is common to the three beams R, G and B as parallel beams. The micro-lens 25-4 is only one micro-lens commonly contacting the micro-lenses 25-1, 25-2 and 25-3.

Since the micro-lenses of the micro-lens array 25 are square-shaped in this modification 2, the display device is most suitable as a projector for displaying images from personal computers and engineering work stations in which it is required to clearly show vertical and horizontal lines.

Figure 17:
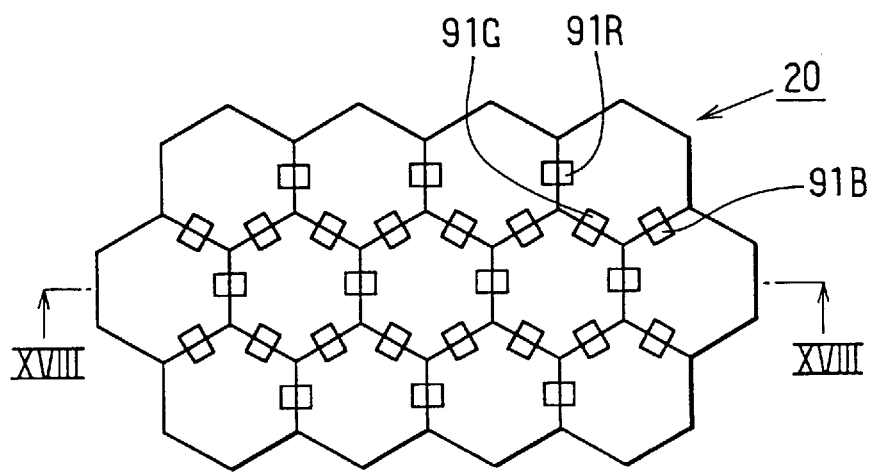
FIGS. 17 and 18 show a modification 3 of the first embodiment according to the present invention.
Figure 18:
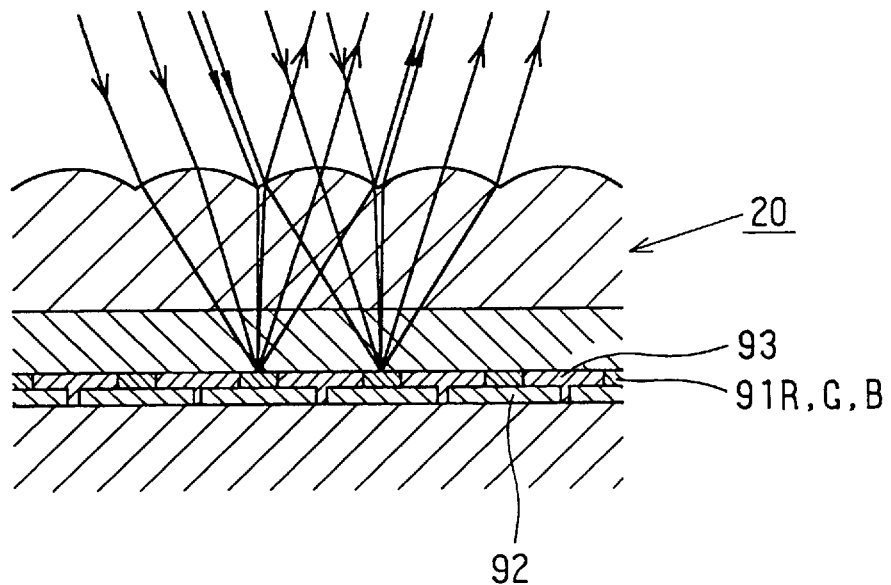

FIGS. 17 and 18 show a modification 3 of the first embodiment of the present invention in which small reflecting picture elements 91R, 91G and 91B are used in place of the reflecting picture element electrodes 31R, 31G and 31B of the first embodiment. As shown in FIG. 17, the small reflecting picture elements 91R, 91G and 91B are placed only on the spots on which light beams are converged by the micro-lenses. These reflecting picture elements 91R, 91G and 91B are placed on centers of three neighboring sides of a hexagon forming a periphery of a micro-lens. It is most preferable, in this modification 3, to set the focal point of the micro-lens on the reflecting picture element as shown in FIG. 18. As shown in FIG. 18, the reflecting picture elements are separated from one another by a separator 93 made of a light-absorbing or a light-scattering material, and picture element electrodes 92 which are wider than the reflecting picture elements 91 are disposed under the reflecting picture elements 91.

To use the small reflecting picture elements separated by the separator is very effective to eliminate dispersing light in the light beam, when a transparent-dispersive liquid crystal such as a polymer dispersed liquid crystal is used in the liquid crystal panel. When the light-absorbing material is used as the separator 93, light dispersed in the liquid crystal is absorbed to the separator and does not come out from the liquid crystal. Therefore, the light beams emitted from the micro-lens array are more in parallel. Accordingly, an image contrast will be improved, and, moreover, the diaphragm 9 for cutting the diverged light may be eliminated. When the light-scattering material is used as the separator 93, the schlieren diaphragm 9 performs its function better to improve an image contrast since the light beams emitted from the micro-lens array include more dispersed light.

Figure 19:
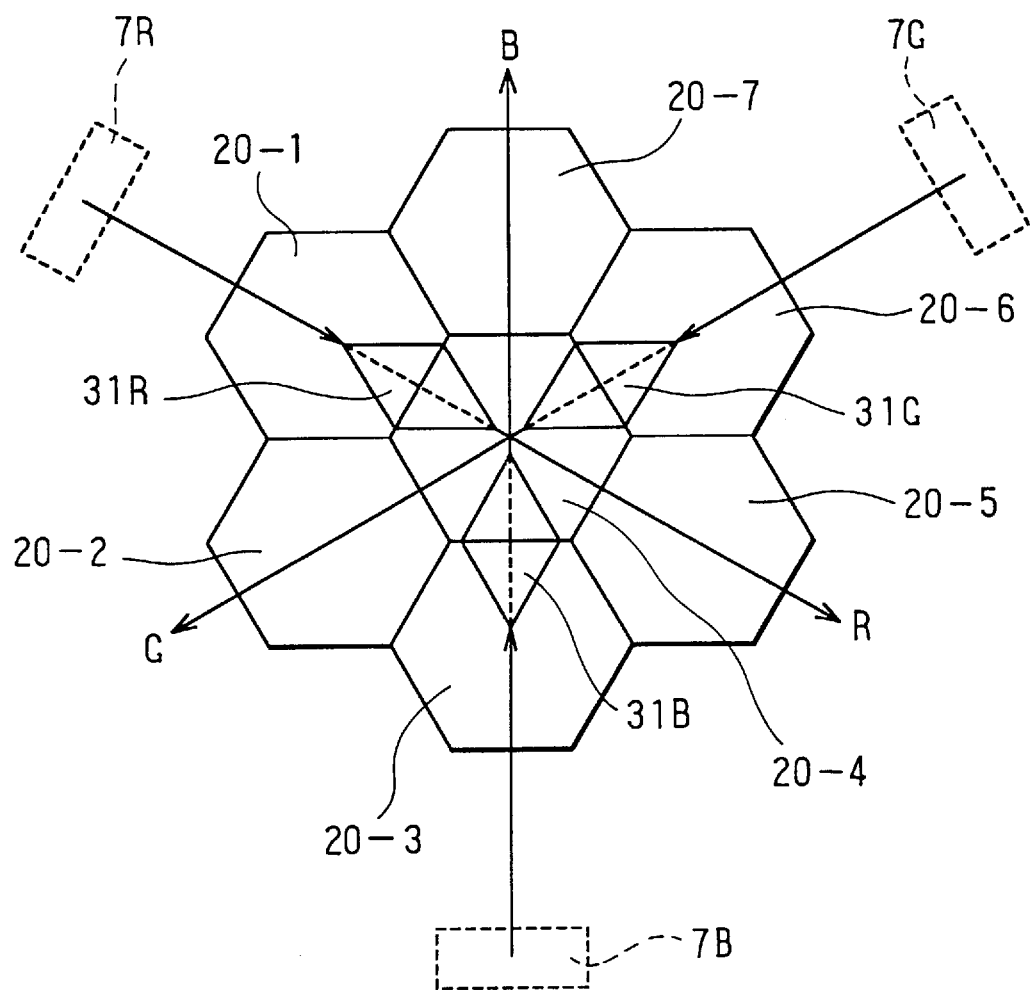
FIG. 19 shows a modification 4 of the first embodiment according to the present invention, showing a positional relation between a micro-lens array and reflecting picture element electrodes.

FIG. 19 shows a modification 4 of the first embodiment of the present invention in which an optical arrangement different from that of the first embodiment is used. In this modification, the three-position reflecting mirrors 7R, 7G and 7B are placed with an angle of 120° separated from each other, and the reflecting picture element electrodes 31R, 31G and 31B are also placed in the directions corresponding to the respective three-position reflecting mirrors. Each hexagon of micro-lenses 20-1, 20-6 and 20-3 is placed next to the hexagon of the common micro-lens 20-4 with a side connected thereto as shown in FIG. 19. The reflecting picture element electrode 31R is placed just beneath the hexagon side common to the micro-lens 20-1 and 20-4. The reflecting picture element electrode 31G is placed just beneath the hexagon side common to the micro-lens 20-6 and 20-4. The reflecting picture element electrode 31B is placed just beneath the hexagon side common to the micro-lens 20-3 and 20-4. The light beams R, G and B incident upon the micro-lenses 20-1, 20-6 and 20-3 respectively are reflected on the reflecting picture element electrodes 31R, 31G and 31B and emitted from the common micro-lens 20-4.

The optical components of this modification 4 can be contained in a cylindrical case, thereby making the display device more compact.

Figure 21:
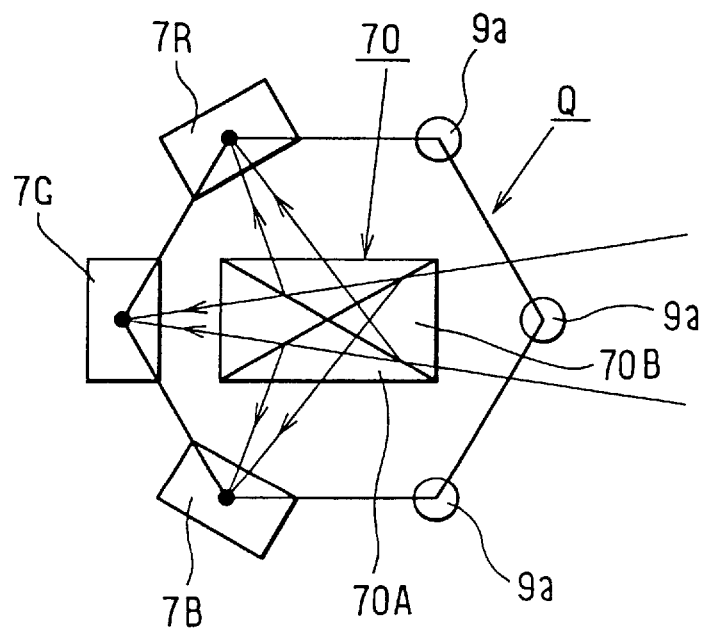
FIGS. 20 and 21 show a second embodiment according to the present invention.
Figure 20:
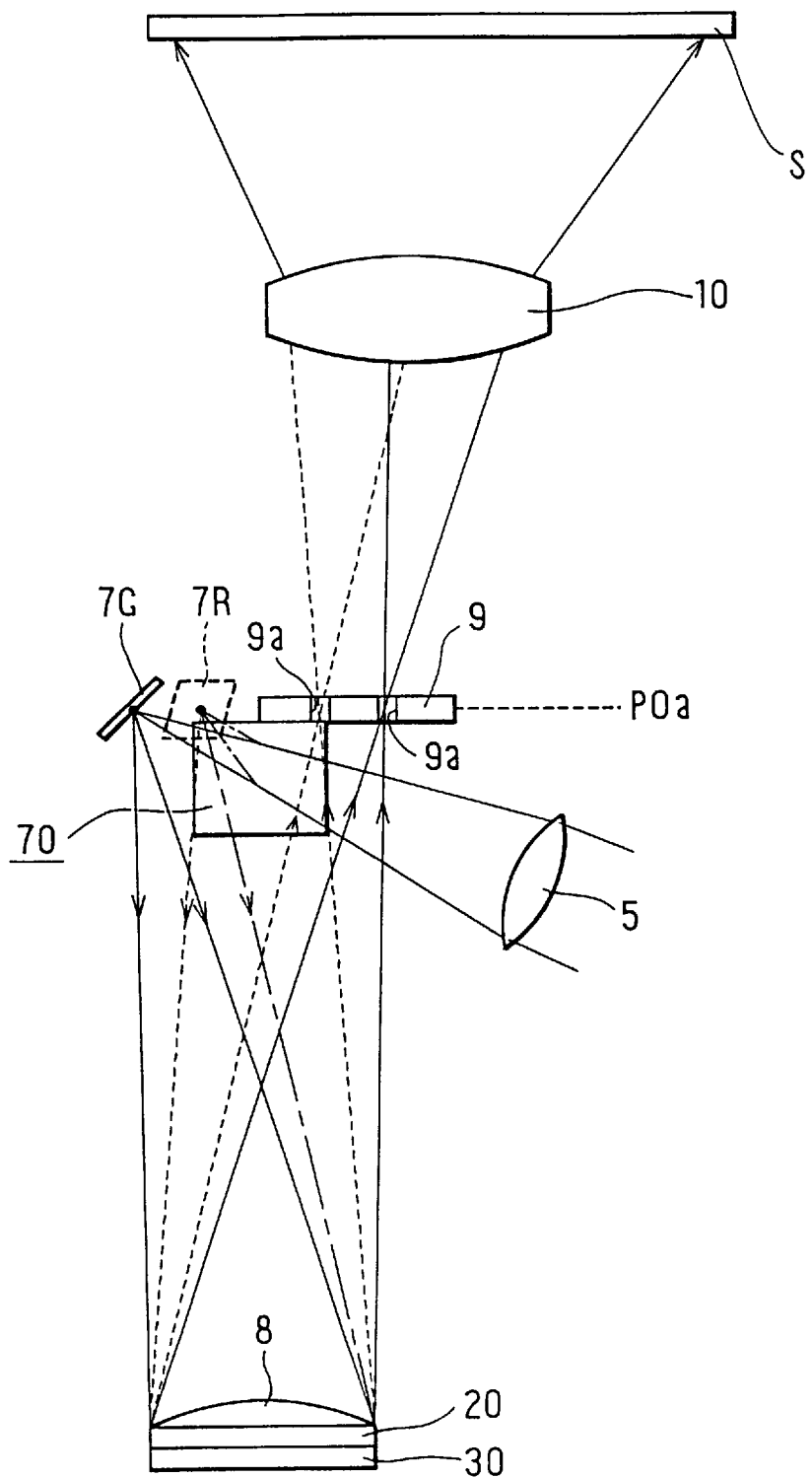

FIGS. 20 and 21 show a second embodiment according to the present invention. In this embodiment, a single dichroic prism 70 is used in place of three dichroic mirrors of the first embodiment. The dichroic prism 70 is made to divide a white light beam from the condenser lens 5 into three light beams of primary colors and to project three beams in the respective directions of three-position reflecting mirrors 7R, 7G and 7B. The dichroic prism 70 is composed of two prisms 70A having a crest angle of 120° and two prisms 70B having a crest angle of 60° as shown in FIG. 21. The three light beams R, G and B are focused on the three-position reflecting mirrors 7R, 7G and 7B, respectively, which are located at neighboring vertexes of the hexagon Q.

The second embodiment enables to make the display device more compact, compared with the first embodiment. In addition, since light beam path lengths of the three beams are equal, the optical system can be structured in an ideal form.

Figure 22:
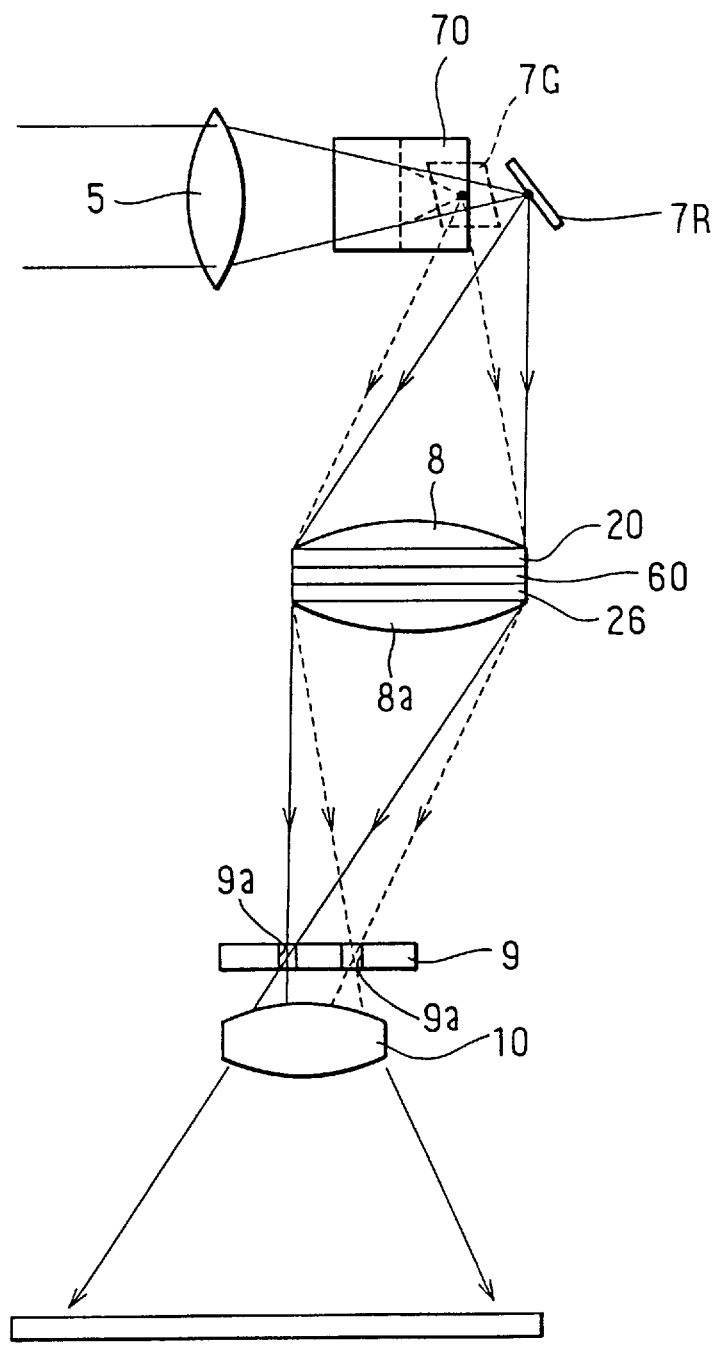
FIG. 22 is a conceptual drawing of an optical system of a third embodiment according to the present invention.
Figure 23:
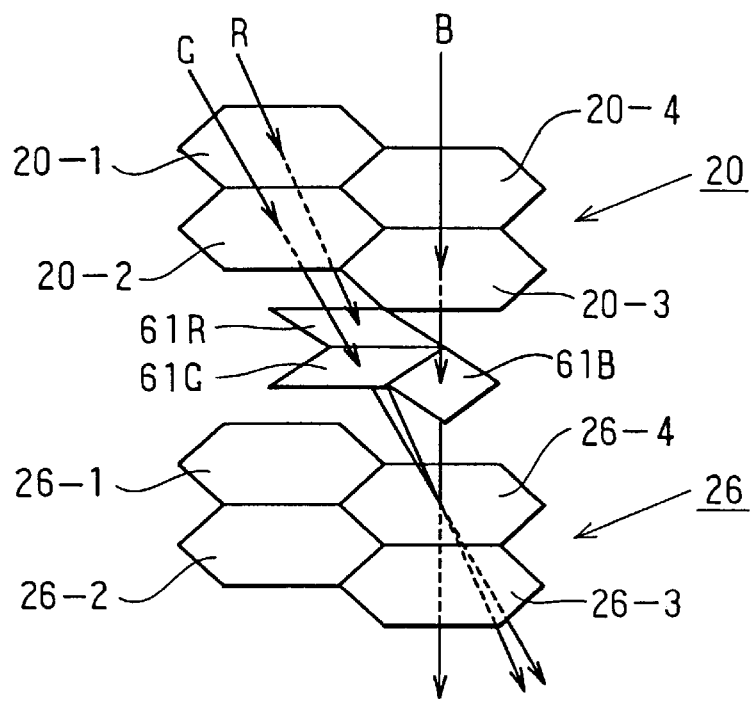
FIG. 23 is a drawing showing a positional relation between a micro-lens and a picture element for respective light beams, R, G and B.
Figure 24:
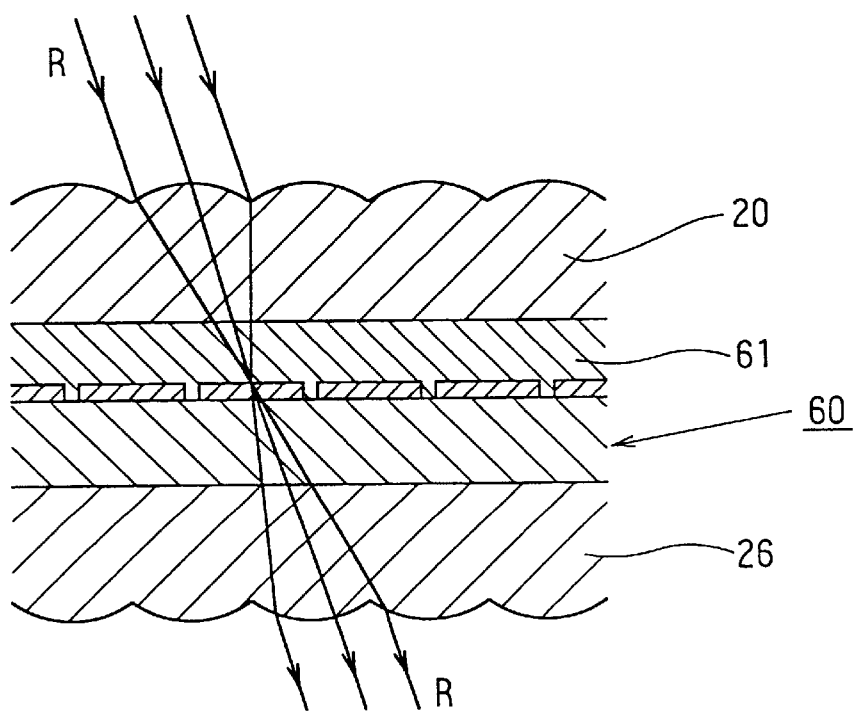
FIG. 24 is a drawing showing a focal point of a light beam in a transparent liquid crystal panel.

FIGS. 22, 23 and 24 show a third embodiment according to the present invention in which a transparent liquid crystal panel 60 is used in place of the reflecting liquid crystal panel 30. In the drawings, the same part numbers as in the first embodiment denote the same parts, and therefore, explanations thereof are not repeated here.

As shown in FIG. 22, the transparent liquid crystal panel 60 is sandwiched between a micro-lens array 20 and another micro-lens array 26 which is the same as the micro-lens array 20. On the micro-lens array 20, a collimator lens 8 is disposed, and on the micro-lens array 26, another collimator lens 8a which is the same as the collimator lens 8 is disposed.

As shown in FIG. 23, micro-lenses 20-1, 20-2, 20-3 and 20-4 of the micro-lens array 20 upon which light beams are incident, and micro-lenses 26-1, 26-2, 26-3 and 26-4 of the micro-lens array 26 from which the light beams are emitted, are disposed at corresponding positions on and beneath the transparent liquid crystal panel 60 which includes picture element electrodes 61R, 61G and 61B. A parallel red light beam R incident upon the micro-lens 20-1 is modulated by the picture element electrode 61R and emitted from the micro-lens 26-4 as a parallel beam. A parallel green light beam G incident upon the micro-lens 20-2 is modulated by the picture element electrode 61G and emitted from the micro-lens 26-4 as a parallel beam. Similarly, a parallel blue light beam B incident upon the micro-lens 20-3 is modulated by the picture element electrode 61B and emitted from the micro-lens 26-4 as a parallel beam. In other words, three light beams R, G and B incident upon the respective micro-lenses are modulated by the respective picture element electrodes of the transparent liquid crystal panel 60 and emitted from the common micro-lens 26-4 as parallel beams.

Since the light beams of three primary colors are emitted from a common micro-lens and projected on the screen in the same manner as in the first embodiment, an image projected on the screen has no blur among three primary colors. Therefore, even when the projected image is observed from a position close to the screen, the image is clear and has no blur. A quality color display is realized in the display device of the third embodiment. In the third embodiment, however, when a transparent liquid crystal panel having small picture element electrodes is used for providing a high definition display, a brightness of the display may be sacrificed a little since a transparency of the liquid crystal panel decreases because of transistors and wiring for driving the liquid crystal, compared with the display device of the first embodiment in which a reflecting liquid crystal panel is used. Modifications in the form of picture element electrodes and the micro-lens array mentioned as modifications of the first embodiment may be applied to the third embodiment, too.

Although dichroic mirrors are used for dividing a white light beam into three primary color beams in the foregoing embodiments, it is also possible to use a hologram which diffracts a light beam having a certain wavelength in place of the dichroic mirrors.

The micro-lens array having a plurality of spherical micro-lenses used in the display device of this invention may be manufactured in the following processes. First, it may be manufactured by machining or molding glass or a plastic material. Secondly, it may be manufactured using a phenomenon that when a certain photosensitive resin material is exposed to light to form a certain pattern thereon, a portion exposed to light rises up receiving non-reacted monomer from a non-exposed portion. Thirdly, it may be manufactured by patterning a thermoplastic resin material to form outer peripheries of micro-lenses using a known photography method, heating it at a temperature higher than its softening temperature, and causing the softened material to drop down toward the outer peripheries of the micro-lenses.

A micro-lens array having a distributed refractive index covered by glass having a flat surface as shown in FIG. 11 may be manufactured using a selective ion diffusion method. In this method, a glass substrate is submerged in an electrolytic salt, and alkaline ions are exchanged between the glass substrate and the electrolytic salt through a mask pattern placed on the glass substrate surface, thereby making the refractive index distributed corresponding to the mask pattern.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A color liquid crystal display device comprising:
   a white light source;
   means for dividing the white light into plural light beams, each having a wavelength range different from one another;
   means for projecting the plural light beams in respective directions;
   means, including liquid crystal, picture element electrodes and driver means for driving the liquid crystal, for modulating the plural light beams according to signals from the driver means;
   optical means for converging the plural light beams on the respective picture element electrodes, combining the plural light beams from the respective picture element electrodes into a single position of the optical means and projecting the combined light beams therefrom; and
   means for displaying a color image of the combined light beam,
   wherein the picture element electrodes reflect the light beams thereon.

2. A color liquid crystal display device of claim 1, further comprising a schlieren diaphragm for eliminating scattered light components from light beams projected from the optical means and incident upon the schlieren diaphragm.

3. A color liquid crystal display device of claim 1, wherein:
the optical means comprises a plurality of square-shaped micro-lenses arranged densely contacting one another, and the combined light beam is projected through a micro-lens which commonly contacts three micro-lenses upon which three visible light beams are incident, respectively; and
each of the picture element electrodes has a shape of a square having an area of one fourth of the square of the micro-lens and is disposed on a side or at a vertex of the micro-lens square.

4. A color liquid crystal display device of claim 1, wherein the optical means converges the plural light beams on the respective picture element electrodes, focusing the converged light beams on surfaces of the electrodes or at positions a little deeper than the surfaces.

5. A color liquid crystal display device of claim 1, wherein:
the optical means comprises a plurality of regular hexagon-shaped micro-lenses arranged densely contacting one another, and the combined light beam is projected through a micro-lens which commonly contacts three micro-lenses upon which three visible light beams are incident, respectively.

6. A color liquid crystal display device of claim 5, wherein:
each of the picture element electrodes has a shape of a rhombus having an area of one third of the regular hexagon of the micro-lens and is disposed on a side of the hexagon so that a short diagonal of the rhombus is placed on the hexagon side.

7. A color liquid crystal display device of claim 4, wherein the picture element electrodes each have a width smaller than the side of the micro-lens hexagon are disposed on the hexagon sides.

8. A color liquid crystal display device comprising:
a white light source;
means for dividing the white light into plural light beams, each having a wavelength range different from one another;
means for projecting the plural light beams in respective directions;
means, including liquid crystal, picture element electrodes and driver means for driving the liquid crystal, for modulating the plural light beams according to signals from the driver means;
optical means for converging the plural light beams on the respective picture element electrodes, combining the plural light beams from the respective picture element electrodes into a single position of the optical means and projecting the combined light beams therefrom; and
means for displaying a color image of the combined light beam,
wherein the plural light beams divided by the dividing means consist of three visible light beams; and
the white light dividing means comprises a cross-dichroic prism.

9. A color liquid crystal display device comprising:
a white light source;
means for dividing the white light into plural light beams, each having a wavelength range different from one another;
means for projecting the plural light beams in respective directions;
means, including liquid crystal, picture element electrodes and driver means for driving the liquid crystal, for modulating the plural light beams according to signals from the driver means;
optical means for converging the plural light beams on the respective picture element electrodes, combining the plural light beams from the respective picture element electrodes into a single position of the optical means and projecting the combined light beams therefrom; and
means for displaying a color image of the combined light beam,
wherein the plural light beams divided by the dividing means consist of three visible light beams; and
the projecting means comprises a three-position reflecting mirror having three mirrors reflecting respective three visible light beams.

10. A color liquid crystal display device comprising:
a white light source;
means for dividing the white light into plural light beams, each having a wavelength range different from one another;
means for projecting the plural light beams in respective directions;
means, including liquid crystal, picture element electrodes and driver means for driving the liquid crystal, for modulating the plural light beams according to signals from the driver means;
optical means for converging the plural light beams on the respective picture element electrodes, combining the plural light beams from the respective picture element electrodes into a single position of the optical means and projecting the combined light beams therefrom; and
means for displaying a color image of the combined light beam,
wherein the picture element electrodes are transparent to pass the light beams therethrough; and
the optical means is composed of two equal portions sandwiching the liquid crystal and the picture element electrodes therebetween.

11. A color liquid crystal display device comprising:
a white light source;
means for dividing the white light into plural light beams, each having a wavelength range different from one another;
means for projecting the plural light beams in respective directions;
means, including liquid crystal, picture element electrodes and driver means for driving the liquid crystal, for modulating the plural light beams according to signals from the driver means;
optical means for converging the plural light beams on the respective picture element electrodes, combining the plural light beams from the respective picture element electrodes into a single position of the optical means and projecting the combined light beams therefrom; and
means for displaying a color image of the combined light beam,
wherein the plural light beams divided by the dividing means consist of three visible light beams,
the optical means comprises a plurality of square-shaped micro-lenses arranged densely contacting one another and the combined light beam is projected through a micro-lens which commonly contacts three micro-lenses upon which three visible light beams are incident, respectively, and each of the picture element electrodes has a shape of a square having an area of one fourth of the square of the micro-lens and is disposed on a side or at a vertex of the micro-lens square.

12. A color liquid crystal display device comprising:

a white light source;

a dichroic mirror having three dichroic mirrors for dividing the white light beam into a red light beam, a green light beam and a blue light beam;

a three-position reflecting mirror having three reflecting mirrors for reflecting the red, green and blue light beams in respective directions;

a micro-lens array having a plurality of spherical micro-lenses disposed to receive the red, green and blue light beams from the three-position reflecting mirror;

a color liquid crystal panel disposed beneath the micro-lens array for modulating the light beams, the color liquid crystal panel including reflecting picture element electrodes for reflecting light beams projected from the micro-lens array;

a driving circuit for supplying color signal voltages to the picture element electrodes to modulate light beams in the color liquid crystal panel;

a shclieren diaphragm for eliminating scattered light components from the light beams projected from the micro-lens array; and a projector including a projection lens system and a screen, for receiving light beams from the shclieren diaphragm and displaying color images on the screen; wherein:

the three spherical micro-lenses disposed in contact with one another in the micro-lens array respectively receive the red, green and blue light beams projected from the three-position reflecting mirror and converge the light beams on the respective reflecting picture element electrodes;

the respective reflecting picture element electrodes reflect the light beams thereon while modulating the light beams in the color liquid crystal panel according to color signal voltages from the driver circuit;

the reflected light beams on three reflecting picture element electrodes are incident upon a common spherical micro-lens which is disposed in common contact with three micro-lenses receiving light beams from the three-position reflecting mirror; and the three light beams incident upon the common spherical micro-lens are combined thereon and projected therefrom.

13. A color liquid crystal display device comprising:

a white light source;

means for dividing the white light into plural light beams, each having a wavelength range different from one another;

means for projecting the plural light beams in respective directions;

means, including liquid crystal, picture element electrodes and driver means for driving the liquid crystal, for modulating the plural light beams according to signals from the driver means;

optical means for converging the plural light beams on the respective picture element electrodes, combining the plural light beams from the respective picture element electrodes into a single position of the optical means and projecting the combined light beams therefrom; and means for displaying a color image of the combined light beam, wherein:

the picture element electrodes are transparent to pass the light beams therethrough;

the optical means comprises a plurality of square-shaped micro-lenses arranged densely contacting one another, and the combined light beam is projected through a micro-lens which commonly contacts three micro-lenses upon which three visible light beams are incident, respectively; and each of the picture element electrodes has a shape of a square having an area of one fourth of the square of the micro-lens and is disposed on a side or at a vertex of the micro-lens square.

14. A color liquid crystal display device comprising:

a white light source;

a dichroic mirror having three dichroic mirrors for dividing the white light beam into a red light beam, a green light beam and a blue light beam;

a three-position reflecting mirror having three reflecting mirrors for reflecting the red, green and blue light beams in respective directions;

a first micro-lens array having a plurality of spherical micro-lenses disposed to receive the red, green and blue light beams from the three-position reflecting mirror;

a color liquid crystal panel disposed beneath the micro-lens array for modulating the light beams, the color liquid crystal panel including transparent picture element electrodes through which light beams projected from the first micro-lens array pass;

a driving circuit for supplying color signal voltages to the picture element electrodes to modulate the light beams in the color liquid crystal panel;

a second micro-lens array, having a plurality of spherical micro-lenses disposed beneath the liquid crystal panel, for projecting the light beams therefrom;

a schlieren diaphragm for eliminating scattered light components from the light beams projected from the second micro-lens array; and a projector including a projection lens system and a screen, for receiving light beams from the schlieren diaphragm and displaying color images on the screen, wherein the respective micro-lenses of the first micro-lens array receiving the red, green and blue light converge the respective light beams on the respective picture element electrodes;

the light beams modulated by the color liquid crystal panel are incident upon a common micro-lens of the second micro-lens array; and the light beams incident upon the common micro-lens are combined thereon and projected therefrom.

* * * * *